(12) United States Patent
Grogg et al.

(10) Patent No.: US 6,692,396 B1
(45) Date of Patent: Feb. 17, 2004

(54) SOLENOID ACTUATED VARIABLE PRESSURE RELIEF VALVE ASSEMBLY FOR LIMITED SLIP DIFFERENTIAL ASSEMBLY

(75) Inventors: John A. Grogg, LaOtto, IN (US); Jeremy J. Wudy, Fort Wayne, IN (US); Jun Yoshioka, Ft. Wayne, IN (US); Martin Kaplan, Avon, CT (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/083,138

(22) Filed: Feb. 27, 2002

(51) Int. Cl.$^7$ ............................................... F16H 48/20
(52) U.S. Cl. ............... 475/86; 192/103 F; 192/85 AA; 137/539; 137/539.5; 251/129.08; 475/88
(58) Field of Search ........................... 475/86, 88, 231, 475/249; 192/35, 82 T, 85 AA, 103 F; 137/539, 539.5, 454.5, 454.4; 251/129.087, 129.14

(56) References Cited

U.S. PATENT DOCUMENTS

| | | | |
|---|---|---|---|
| 3,546,969 A | * 12/1970 | Gibson et al. | 475/88 |
| 3,747,635 A | * 7/1973 | Garamy | 137/539.5 |
| 4,041,804 A | * 8/1977 | Clark | 475/88 |
| 4,556,085 A | * 12/1985 | Warrick | 137/625.65 |
| 4,674,536 A | * 6/1987 | Warrick | 137/614.19 |
| 5,051,631 A | * 9/1991 | Anderson | 310/14 |
| 5,297,994 A | 3/1994 | Suzuki et al. | |
| 5,709,627 A | 1/1998 | Teraoka | |
| 5,749,801 A | 5/1998 | Teraoka et al. | |
| 5,967,285 A | * 10/1999 | Mohan et al. | 192/103 F |
| 5,984,259 A | * 11/1999 | Najmolhoda et al. | 251/50 |
| 6,056,658 A | 5/2000 | Illmeier | |
| 6,164,322 A | * 12/2000 | Najmolhoda et al. | 137/540 |
| 6,176,800 B1 | 1/2001 | Shaffer et al. | |
| 6,183,387 B1 | 2/2001 | Yoshioka | |
| 6,186,258 B1 | 2/2001 | Deutschel et al. | |
| 6,283,885 B1 | * 9/2001 | Irwin | 475/88 |
| 6,343,621 B1 | * 2/2002 | Holmes et al. | 137/625.61 |
| 6,461,267 B1 | * 10/2002 | Paielli | 475/150 |
| 6,464,056 B1 | * 10/2002 | Lowell et al. | 192/35 |
| 6,474,433 B1 | * 11/2002 | Yoshioka | 180/248 |

FOREIGN PATENT DOCUMENTS

EP          0 077 599 A1  *  4/1983

* cited by examiner

*Primary Examiner*—Rodney H. Bonck
*Assistant Examiner*—David D. Le
(74) *Attorney, Agent, or Firm*—Liniak, Berenato & White (57) ABSTRACT

A differential assembly for a motor vehicle comprises a differential case rotatably supported in an axle housing, opposite output shafts drivingly connected to the differential case, a friction clutch pack for controlling the differential action, and a hydraulic clutch actuator for selectively fictionally loading the clutch pack. The hydraulic clutch actuator includes a variable pressure relief valve assembly to selectively control the friction clutch pack. The variable pressure relief valve assembly includes a valve closure member, a valve seat complementary to the valve closure member, and an electro-magnetic actuator for engaging the valve closure member and urging thereof against the valve seat with an axial force determined by a magnitude of an electric current supplied to the electro-magnetic actuator so as to selectively vary a release pressure of the pressure relief valve assembly based on the magnitude of the electric current.

27 Claims, 4 Drawing Sheets

SOLENOID ACTUATED VARIABLE PRESSURE RELIEF VALVE ASSEMBLY FOR LIMITED SLIP DIFFERENTIAL ASSEMBLY

BACKGROUND OF THE INVENTION

1. Field of the Invention

The present invention relates to limited slip differential assemblies for motor vehicles, and more particularly to a limited slip differential assembly having an electronically controlled hydraulic actuator including an electro-magnet actuated variable pressure relief valve for limiting a relative rotational speed between two driven shafts above a predetermined amount.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

Such differential assemblies are typically called limited slip differentials. Conventionally, they use a frictional clutch between the side gear and the differential case. The frictional clutch may be selectively actuated by various hydraulic actuator assemblies, which are constructed of elements disposed inside the differential casing. The hydraulic actuator assemblies internal to the differential case often include displacement pumps disposed inside the differential casing and actuated in response to a relative rotation between the differential case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

Recent advances in vehicle control may require the disabling of the limited slip feature of the differential at moderate to high speeds. One such system is the yaw stability control, which uses the vehicle's brakes to correct the trajectory of the vehicle during a turn. The impulse braking of the yaw stability control feature generates a speed difference between the wheels on either side of the vehicle. The limited slip feature will engage due to this speed difference and may interfere with the performance of the yaw stability control feature. There is therefore a need to disable the limited slip feature of the hydraulic limited slip differential during specified conditions to ensure proper performance of the devices like yaw stability control while also allowing the limited slip feature to be enabled at other specified conditions where traction may be needed and where yaw control is not essential. There is a problem with current hydraulically actuated limited slip differentials in that they do not have a simple on/off capability which is separate and distinct from the hydraulic pressure supply/control circuit actuating the clutch assemblies.

It is the intent of this invention to overcome these shortcomings by providing an external control of the hydraulic pressure generated within a hydraulically actuated limited slip differential in which the limited slip clutch can either be turned on or off, or set at any intermediate condition by controlling the maximum system hydraulic pressure limit.

SUMMARY OF THE INVENTION

The present invention provides an improved electronically controlled differential assembly providing both limited slip and open differential capabilities.

The differential assembly in accordance with the preferred embodiment of the present invention includes a rotatable differential case rotatably supported within an axle housing and forming housing a differential gearing rotatably supported in the case and a pair of opposite output axle shafts in meshing engagement with the differential gearing to permit differential rotation thereof. The differential assembly includes a friction disk clutch pack disposed within the differential case and provided to selectively lock the differential assembly. The friction clutch pack includes a number of alternating outer friction plates non-rotatably coupled to the differential case and inner friction plates drivingly coupled to one of the output axle shafts. The differential assembly further includes a hydraulic clutch actuator for selectively frictionally loading the clutch pack. The hydraulic clutch actuator comprises a hydraulic pump for generating a hydraulic pressure, a piston assembly disposed within the differential case between the pump and the clutch pack and defining a pressure chamber, and a variable pressure relief valve assembly to selectively control said limited slip assembly. The variable pressure relief valve assembly has a pressure relief valve and a solenoid actuator for selectively setting a maximum hydraulic pressure attainable within the pressure chamber between a maximum release pressure when the friction clutch pack is in the fully "ON" condition, and a minimum release pressure when the friction clutch pack is in the fully "OFF" condition.

The variable pressure relief valve assembly includes a valve closure member, a valve seat complementary to the valve closure member, and an electro-magnetic actuator for engaging the valve closure member and urging thereof against the valve seat with an axial force determined by a magnitude of an electric current supplied to the electro-magnetic actuator so as to selectively vary a release pressure of the pressure relief valve assembly based on the magnitude of the electric current.

Therefore, the differential assembly in accordance with the present invention allows to dynamically control the hydraulic pressure of the hydraulic clutch actuator for selectively frictionally loading the clutch pack, thus providing an optimized amount of limited slip between the fully "ON" and "OFF" conditions.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
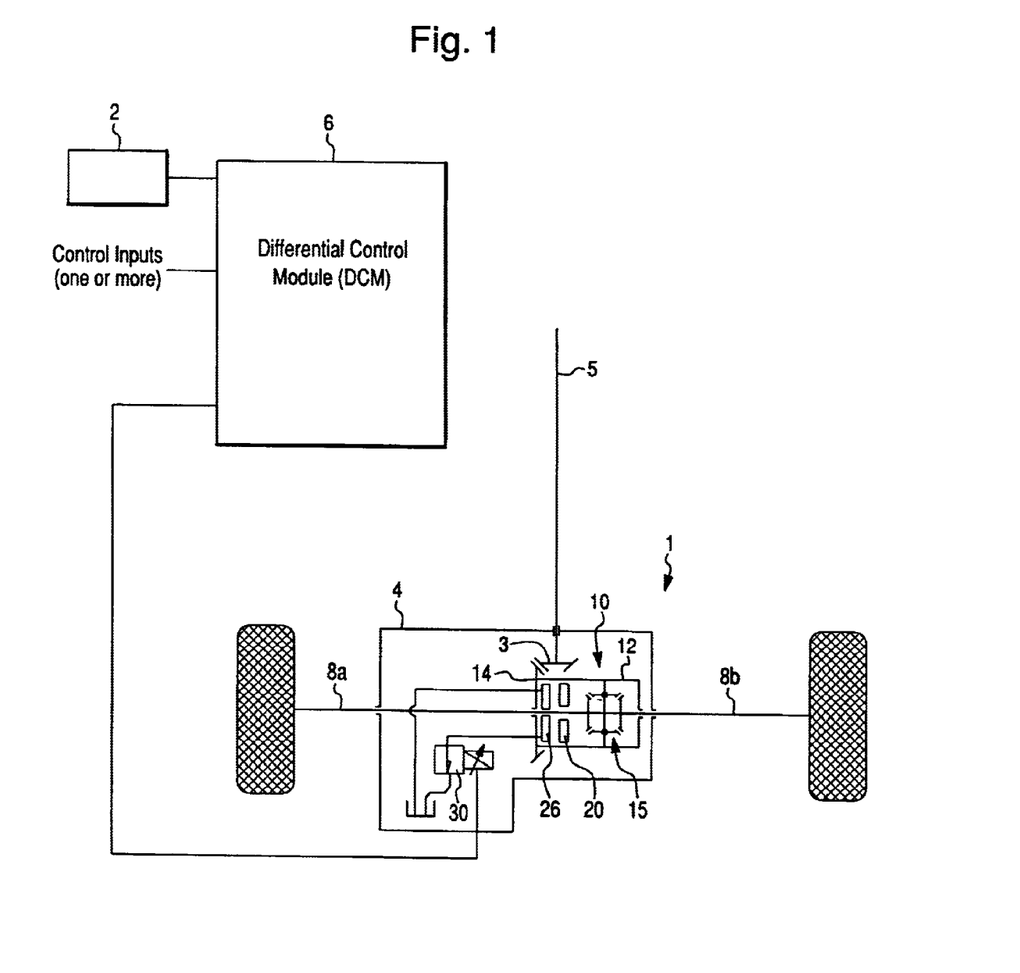
FIG. 1 is a schematic diagram showing a rear axle assembly of a motor vehicle including an electronically controlled limited slip differential assembly.

FIG. 1 schematically depicts a vehicle drive axle assembly 1 including a selectively operable limited slip differential (LSD) assembly 10. However, it is to be understood that while the present invention is described in relation to a speed sensitive limited slip differential, the present invention is equally suitable for use in other hydraulically actuated friction couplings, such as torque coupling mechanisms for a drive-train utilizing a speed sensitive limited slip device.

The differential assembly 10 comprises a rotatable differential case 12 rotatably supported within an axle housing 4 and driven by a drive pinion gear 3 transmitting a drive torque from an engine (not shown) to a ring gear 14 through a propeller shaft 5. A differential gear mechanism 15 disposed within the differential case 12 is operatively coupled to output axle shafts 8a and 8b for allowing differential rotation thereof. The LSD assembly 10 further includes a limited slip device in the form of a hydraulically actuated friction clutch assembly including a friction clutch pack 20 that, when engaged, limits the differential speed between output axle shafts 8a and 8b, a speed sensitive hydraulic displacement pump 26 providing a pressurized hydraulic fluid for actuating the clutch pack 20, and a variable pressure relief valve assembly 30 for selectively controlling a discharge pressure of the pump 26 and, subsequently, the clutch pack 20. The variable pressure relief valve assembly 30 is operated by an electro-magnetic (preferably, solenoid) actuator, electronically controlled by a differential control module (DCM) 6 based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration and a yaw stability control system actuation, and a programmable control mechanism could be used to interface with the hydraulic actuated limited slip differential. The DCM 6 is also connected to a source of an electric power supply, such as an electric storage battery 2 mounted on the motor vehicle.

When energized, solenoid-operated valve assembly 30 is capable of modulating a pump discharge pressure in a variable range from a minimum pressure to a maximum pressure, thereby variably controlling a drive torque distribution between the output axle shafts 8a and 8b in a range from a minimum torque value to a maximum torque value. For example, the yaw stability control actuation may be actuated when the vehicle yaw rate reaches a predetermined level. At this same yaw rate, the variable pressure relief valve assembly 30 will be actuated to disengage the limited slip feature of the differential 10. When the vehicle yaw rate falls below the predetermined level, the limited slip feature can be turned back "ON". Another vehicle parameter which could be effectively used in this manner is the steering angle. This could be sensed to determine if the limited slip feature is needed. At ranges from small to no steering angle the limited slip feature can be made available and then disengaged at larger steering angles. Either of these methods could also be combined with the previously mentioned method of optimizing the amount of limited slip available between an "ON" and "OFF" position by monitoring differences in wheel RPM or speed.

Figure 2:
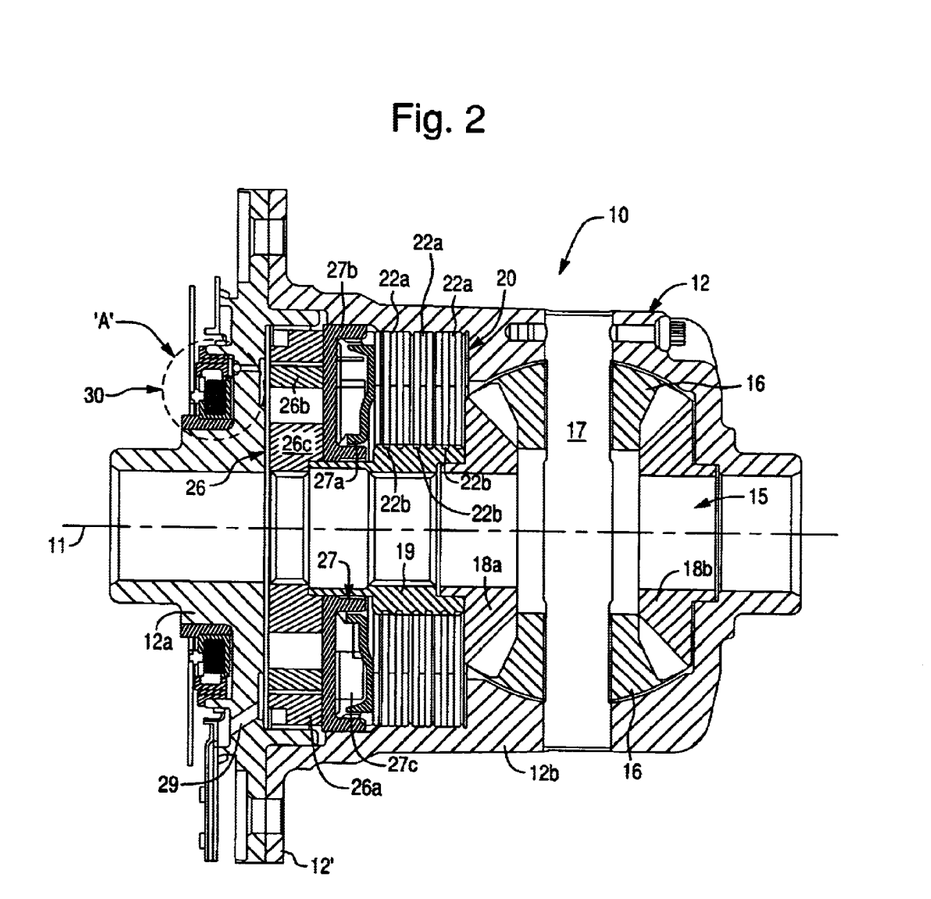
FIG. 2 is a sectional view of the electronically controlled limited slip differential assembly in accordance with the present invention.

FIG. 2 of the drawings illustrates in detail the preferred arrangement of the differential assembly 10 in accordance with the present invention. Reference numeral 12 defines the differential case rotatably supported in the axle housing 4 (shown in FIG. 1) through roller bearings (not shown), and defines an axis of rotation 11. The differential case 12 is made of two half members 12a and 12b fastened to each other, preferably by means of bolts (not shown). The ring gear 14 (shown in FIG. 1) is bolted or other wise secured to the differential case 12 at flange 12'. The differential gear mechanism 15 disposed within the differential case 12 includes a set of pinion gears 16 rotatably supported on a pinion shaft 17 secured to the differential case 12. The pinion gears 16 engage a pair of opposite side gears 18a and 18b adapted to rotate about the axis 11. The side gears 18a and 18b are splined to the output axle shafts 8a and 8b respectively. Disposed adjacent the side gear 18a is an inner clutch sleeve 19 having external splines and drivingly coupled to the associated axle shaft 8a.

The friction clutch pack 20 of the limited slip device is provided within the differential case 12. The friction clutch pack 20, well known in the prior art, includes sets of alternating outer friction plates 22a and inner friction plates 22b. Conventionally, an outer circumference of the outer friction plates 22a is provided with projections that non-rotatably engages corresponding grooves formed in the differential case 12. Similarly, an inner circumference of the inner friction plates 22b is provided with projections that non-rotatably engage corresponding grooves formed in the clutch sleeve 19, which in turn is splined to the associated axle shaft 8a. At the same time, both the outer friction plates 22a and the inner friction plates 22b are slideable in the axial direction. The clutch plates 22a frictionally engage the clutch plates 22b to form a torque coupling arrangement between the differential case 12 and the differential mechanism 15 formed by the pinion gears 16 and side gears 18a, 18b. Torque is transferred from a ring gear (not shown) to the differential case 12, which drives the differential mechanism 15 through the pinion shaft 17.

The clutch pack 20 is selectively actuated by a hydraulic clutch actuator including the speed sensitive hydraulic displacement pump 26, and a piston assembly 27 for axially loading the clutch pack 20.

The speed sensitive hydraulic displacement pump 26 disposed within the differential case 12 actuates the clutch pack 20 when the relative rotation between the output axle shafts 8a and 8b occurs. It will be appreciated that a hydraulic pressure generated by the pump 26 is substantially proportional to a rotational speed difference between the output axle shafts 8a and 8b. Preferably, the hydraulic displacement pump 26 employed to provide pressurized hydraulic fluid to actuate the clutch pack 20 is a gerotor pump. The gerotor pump 26 includes an outer ring member 26a, an outer rotor 26b, and an inner rotor 26c. The inner rotor 26c drivingly coupled to the output axle shaft 8a, and the outer ring member 26a is secured to the differential case 12. The inner rotor 26c has one less tooth than the outer rotor 26b and when the inner rotor 26c is driven, it will drive the outer rotor 26b, which can freely rotate within the outer ring member 26a eccentrically with respect to the inner rotor 26c, thus providing a series of decreasing and increasing volume fluid pockets by means of which fluid pressure is created. Therefore, when relative motion takes place between differential case 12 and the output axle shaft 8a, the inner rotor 26c of the gerotor pump 26 generates hydraulic fluid pressure. However, it will be appreciated that any other appropriate type of hydraulic pump generating the hydraulic pressure in response to the relative rotation between the differential case 12 and the output axle shaft 8a is within the scope of the present invention.

The piston assembly 27 including a hydraulically actuated piston 27a disposed within a piston housing 27b, serves to compress the clutch pack 20 and retard any speed differential between the side gear 18a and the differential case 12. This results in a retardation of any speed differential between the axle shafts 8a and 8b. Pressurized hydraulic fluid to actuate the piston 27a and engage the clutch pack 20 is provided by the gerotor pump 26. In such an arrangement, when a speed difference between the output shafts 8a, 8b exists, the hydraulic fluid is drawn into the pump 26 through a suction passage 29. The gerotor pump 26 pumps the pressurized fluid into a piston pressure chamber 27c defined between the piston 27a and the piston housing 27b to actuate the clutch pack 20. As the speed difference increases, the pressure increases. The pressurized fluid in the piston pressure chamber 27c creates an axial force upon the piston 27a for loading the clutch pack 20, which is further resisted by the friction plates 22a and 22b. The loading of the clutch pack 20 allows for a torque transfer distribution between the axle shafts 8a and 8b.

Figure 3:
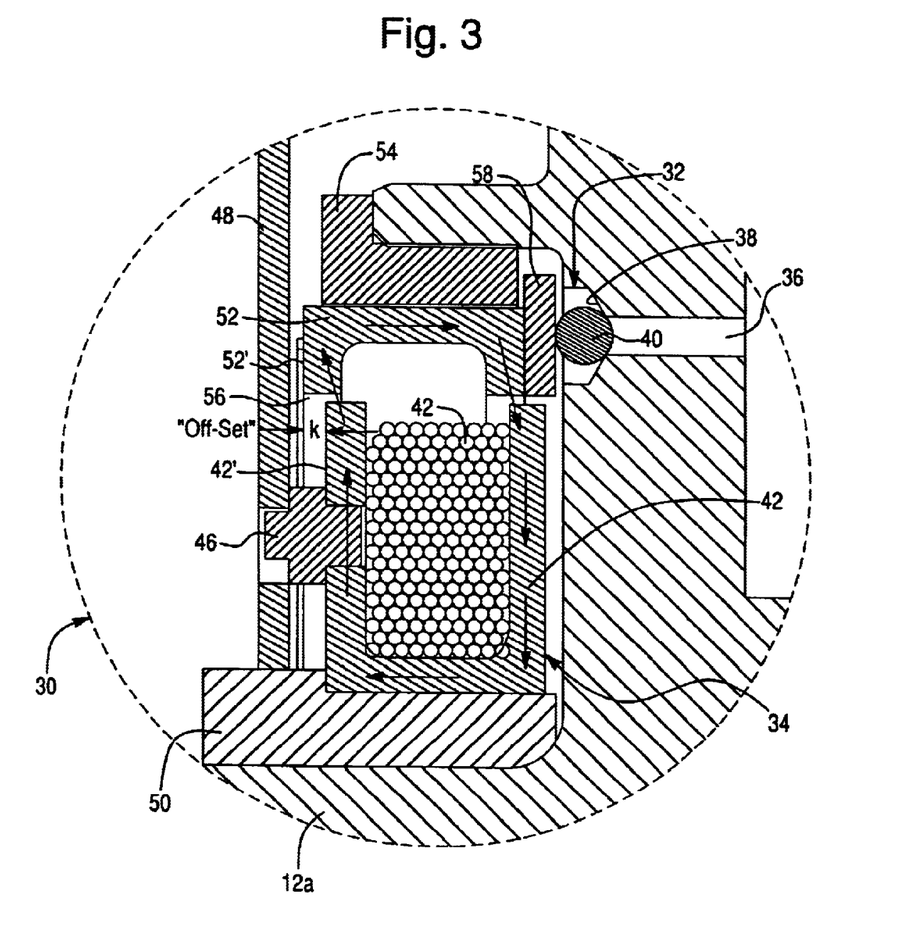
FIG. 3 is an enlarged partial sectional view of a variable pressure relief valve assembly shown in a circle 'A' in FIG. 2.

In order to control the fluid pressure in the piston pressure chamber 27c and, subsequently, the output torque distribution of the limited slip differential assembly, the variable pressure relief valve assembly 30 is provided. The variable pressure relief valve assembly 30 according to the present invention, illustrated in detail in FIG. 3, is in the form of an electro-magnetic valve assembly and comprises a pressure relief check valve 32 controlled by an electro-magnetic actuator 34 that may be any appropriate electro-magnetic device well known in the art, such as solenoid.

The check valve 32 comprises a fluid relief passageway 36 that is in fluid communication with the piston pressure chamber 27c, a substantially conical valve seat 38 that is in open communication with the passageway 36, and a spherical valve closure member 40 adapted to seat in the valve seat 38 for sealing the fluid relief passageway 36. It will be appreciated that the valve closure member 40 may be in any appropriate form other than spherical, such as conical. The valve seat 38 is formed in the half member 12a of the differential case 12. The valve closure member 40 is movable between a closed position when the valve closure member 40 engages the valve seat 38 (as shown in FIG. 3), and an open position when the valve closure member 40 is axially spaced from the valve seat 38.

The electro-magnetic actuator 34 comprises a substantially annular coil housing 42, a coil winding 44 wound about the coil housing 42, and a substantially annular armature 52 axially movable in the direction of the axis 11. The armature 52 is coaxial to the coil winding 44 and is radially spaced from the coil housing 42, thus defining an air gap 56. The coil housing 42 is supported by the differential case 12 substantially coaxially to the axis 11 through a coil housing bushing 50 for rotation relative to the differential case 12. At the same time, the coil housing 42 is non-rotatable relative to an axle housing (not shown). The coil housing 42 is preferably formed of a single-piece magnetically permeable material, such as conventional ferromagnetic materials. Alternatively, the coil housing 42 may be formed of a plurality of laminations of the magnetically permeable material. The coil housing bushing 50 is made of any appropriate non-magnetic material well known to those skilled in the art. In order to non-rotatably secure the coil housing 42 to the axle housing (not shown), an anti-rotation pin 46 is employed for non-rotatably coupling the coil housing 42 to an anti-rotation plate 48 fixed to the axle housing (not shown). Alternatively, the coil housing 42 may be non-rotatably mounted to the differential case 12.

The annular armature 52 is supported within an armature bushing 54 for axially movement in the direction of the axis 11. The armature bushing 54 is non-rotatably mounted to the half member 12a of the differential case 12 by any appropriate means, such as press-fitting, adhesive bonding, etc. Preferably, the armature bushing 54 is made of any appropriate non-magnetic material well known to those skilled in the art.

In the exemplary embodiment illustrated in FIGS. 2 and 3, the armature 52 is disposed outside the coil winding 44 of the electro-magnetic actuator 34. Alternatively, the armature 52 may be disposed within the coil winding 44.

The valve closure member 40 is urged and held in place by against the valve seat 38 by an actuator plate 58. In turn, the actuator plate 58 is adapted to engage the armature 52 of the electro-magnetic actuator 34 disposed outside the coil winding 44 thereof. Preferably, the actuator plate 58 is in the shape of an annular segment of approximately 15° and is made of any appropriate non-magnetic material well known to those skilled in the art. Furthermore, the actuator plate 58 is fastened to the armature 52 by any appropriate means known in the art, such as threaded connectors, adhesive bonding, etc.

When electrical current is supplied to the coil winding 44, a magnetic flux is caused to flow through the armature 52. The magnetic flux creates an axial force that axially displaces the armature 52 relative to the coil winding 44. The armature 52 moves the actuator plate 58, which, in turn, urges the valve member 40 upon the valve seat 38 with a predetermined axial retaining force that is a function of the electrical current supplied to the coil winding 44. It will be appreciated by those skilled in the art that the pressurized hydraulic fluid will not flow through the pressure relief valve 32 until the hydraulic pressure generated by the gerotor pump 26 results in a reaction force larger than the axial retaining force exerted to the armature 52 by the magnetic flux generated by the coil winding 44, thereby pushing the valve closure member 40 out of the valve seat 38. Therefore, such an arrangement creates a relief valve with a release pressure that is a function of the current supplied to the coil winding 44, and provides a predetermined pressure limit in the hydraulic system. Thus, the variable pressure relief valve assembly 30 selectively sets the release pressure of the pressure relief valve 32 based on the magnitude of the electrical current supplied to the coil winding 44 and, subsequently, defines the magnitude of the pressure within the piston pressure chamber 27c.

When a maximum current is applied to the coil winding 44 of the solenoid actuator 34, the retaining force of the pressure relief valve 32 is at its maximum, thus a maximum release pressure is provided by the pressure relief check valve 32. In this configuration, the maximum pressure attainable within the differential case 12 is sufficient to fully actuate the hydraulic clutch pack 20 which results in providing the limited slip function in the differential assembly 10, and the limited slip feature is in the fully "ON" condition.

The pressure limit of the pressure relief valve 32, i.e. the release pressure of the pressure relief valve 32, can be adjusted by controlling the current applied to the coil winding 44 of the electro-magnetic actuator 34.

As less current is applied to the coil winding 44, less axial retaining force is exerted to the relief valve 32, thus the less is the release pressure provided by the relief valve 32. This results in an adjustment mechanism for lowering the maximum system pressure attainable within the differential case 12.

When a minimum current is applied to the coil winding 44 of the solenoid actuator 34, the retaining force of the pressure relief valve 32 is at its minimum, thus a minimum release pressure is provided by the relief valve 32. In this configuration, the limited slip feature is in the fully "OFF" condition in that the maximum pressure which can be obtained in the differential case 12 is not high enough to engage the clutch pack 20, essentially disabling the limited slip feature of the hydraulic limited slip differential assembly 10 without affecting the differential capability.

In between the "ON" and "OFF" conditions of the limited slip differential assembly 10 the release pressure of the relief valve 32 may be set at any value by modulating the current applied to the coil winding 44 of the solenoid actuator 34. This provides the hydraulic limited slip differential assembly 10 with a variable maximum pressure limit in which the amount of the limited slip available to the differential assembly 10 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

It will be appreciated by those skilled in the art that the armature 52 may have any appropriate shape in the cross-section. Preferably, as illustrated in the exemplary embodiment of FIG. 3, the armature 52 has a generally U-shaped cross-section with magnetic poles facing the coil winding 44, similar to those used in reluctance electric motors. Moreover, the mutual geometric arrangement of the armature 52 and the coil housing 42 is such as to maintain a substantially constant axial force applied upon the valve closure member 40 by the electro-magnetic actuator 34 as it moves from its closed to open position. This is achieved by maintaining a proper "off-set" between the armature 52 and the coil housing 42 (and, consequently, the coil winding 42). The term "off-set" is determined here as an amount of misalignment between the armature 52 and the coil housing 42, or a distance k between an outward face 42' of the coil housing 42 and an outward face 52' of the armature 52, as illustrated in FIG. 3.

Figure 4:
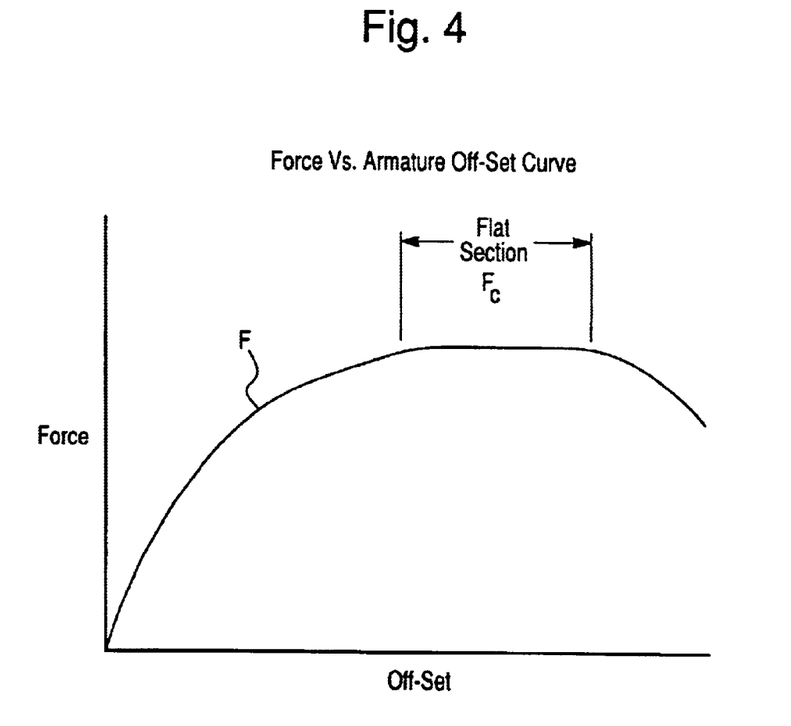
FIG. 4 is a graph showing an axial force applied upon a valve closure member by an electro-magnetic actuator as a function of "off-set" between a coil housing and an armature.

FIG. 4 depicts a graph showing the axial force applied upon the valve closure member 40 by the electro-magnetic actuator 34 as a function of the "off-set" distance k while a constant magnitude of the electric current is supplied to the coil winding 44. The graph is in the form of a curved line F having a substantially "flat" section $F_C$ wherein the axial force varies insignificantly with respect to the "off-set" distance k. However, operation outside of this section $F_C$ results in an abrupt change of the axial force. Thus, while the electro-magnetic actuator 34 of the relief valve assembly 30 is operated in the "flat" section $F_C$, the axial force applied upon the valve closure member 40 by the electro-magnetic actuator 34 is substantially constant as it moves from its closed to open position, and is a function of the electrical current supplied to the coil winding 44. On the other hand, operation outside of this "flat" section $F_C$ results in the axial force being a function of both the current and the "off-set" distance k that would make control of the variable pressure relief valve much more difficult requiring a closed loop feedback as to the valve's "off-set". Other, more traditional solenoid pole designs do not provide this "flat" section in the axial force versus "off-set" distance curve.

For the above described reason, the electro-magnetic actuator 34 in accordance with the preferred embodiment of the present invention is arranged to provide the "off-set" distance k between the coil housing 42 and the armature 52 within the "flat" section $F_C$ of the axial force versus "off-set" distance curve so as to ensure that the axial force applied upon the valve closure member 40 by the electro-magnetic actuator 34 is substantially constant as it moves from its closed to open position, and is a function only of the electrical current supplied to the coil winding 44.

Therefore, the electronically controlled differential assembly in accordance with the present invention represents a novel arrangement of the limited slip differential assembly provided with an electro-magnetic actuator for activating a variable pressure relief valve for allowing both limited slip and open differential capabilities.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A differential assembly in a motor vehicle, said differential assembly comprising:
   a differential case to be rotated by an outside drive torque;
   at least one output shaft drivingly connected to said differential case through a differential gear mechanism;
   a friction clutch pack for selectively engaging and disengaging said differential case and said output shaft, said clutch pack comprising at least one inner friction plate coupled to rotate with said at least one output shaft and at least one outer friction plate coupled to rotate with said differential case; and
   a hydraulic clutch actuator for selectively frictionally loading said clutch pack, said actuator comprising:
      a hydraulic pump for generating a hydraulic pressure to frictionally load said clutch pack; and
         a variable pressure relief valve assembly to selectively control said friction clutch pack, said variable pressure relief valve assembly including a valve closure member, a valve seat complementary to said valve closure member, and an electro-magnetic actuator for engaging said valve closure member and generating a variable electro-magnetic force urging said valve closure member against said valve seat so as to selectively vary a release pressure of said pressure relief valve assembly based on a magnitude of an electric current supplied to said electro-magnetic actuator,
         wherein said valve closure member is movable between a closed position when said valve closure member engages said valve seat and an open position when said valve closure member is axially spaced from said valve seat.

2. The differential assembly as defined in claim 1, wherein said friction clutch pack includes a plurality of inner friction plates coupled to rotate with said at least one output shaft and a plurality of outer friction plates coupled to rotate with said differential case, said friction plates being frictionally engageable with one another.

3. The differential assembly as defined in claim 1, wherein said hydraulic pump is disposed within said differential case and generates said hydraulic pressure in response to relative rotation between said differential case and said at least one output shaft.

4. The differential assembly as defined in claim 3, wherein said pump is a gerotor pump.

5. The differential assembly as defined in claim 1, wherein said variable pressure relief valve assembly is adapted to selectively set a maximum hydraulic pressure attainable within said differential case between a maximum release pressure and a minimum release pressure.

6. The differential assembly as defined in claim 5, wherein said minimum release pressure is at a level that prevents actuation of said friction clutch pack.

7. The differential assembly as defined in claim 5, wherein said maximum release pressure is at a level that enables complete actuation of said friction clutch pack.

8. The differential assembly as defined in claim 5, wherein said maximum hydraulic pressure attainable within said differential case is adjustable between said minimum release pressure and said maximum release pressure so as to enable partial actuation of said friction clutch pack.

9. The differential assembly as defined in claim 1, wherein said selective control of said friction clutch pack is determined in response to at least one vehicle parameter.

10. The differential assembly as defined in claim 9, wherein said at least one vehicle parameter is selected from the group consisting of a vehicle speed, a wheel speed difference, a vehicle yaw rate, a steering angle, an engine throttle position, a vehicle lateral acceleration, a brake application, an ice detection, a moisture detection, a driveline configuration, and yaw stability control system actuation.

11. The differential assembly as defined in claim 1, wherein said hydraulic clutch actuator further including a piston assembly disposed within said differential case between said pump and said clutch pack and defining a pressure chamber, wherein said variable pressure relief valve assembly selectively controls a maximum hydraulic pressure attainable within said pressure chamber.

12. The differential assembly as defined in claim 11, wherein said variable pressure relief valve assembly selectively controls said maximum pressure attainable within said pressure chamber between a maximum release pressure and a minimum release pressure.

13. The differential assembly as defined in claim 12, wherein said minimum release pressure is at a level that prevents actuation of said friction clutch pack.

14. The differential assembly as defined in claim 12, wherein said maximum release pressure is at a level that enables complete actuation of said friction clutch pack.

15. The differential assembly of claim 12, wherein said maximum hydraulic pressure attainable within said pressure chamber is adjustable between said minimum release pressure and said maximum release pressure so as to enable partial actuation of said friction clutch pack.

16. The differential assembly as defined in claim 1, wherein said electro-magnetic actuator including a coil winding supported by said differential case and an armature radially spaced from said coil winding and axially movable relative thereto in response to a magnetic flux generated by said coil winding when said electrical current is supplied thereto, said armature engages said valve closure member and urges said valve closure member against said valve seat with an axial force produced by said magnetic flux and determined by said magnitude of said electric current for selectively setting up said release pressure of said valve closure member.

17. The differential assembly as defined in claim 16, wherein said coil winding is coaxial to an axis of rotation of said differential case.

18. The differential assembly as defined in claim 16, wherein said coil winding is rotatably supported by said differential case.

19. The differential assembly as defined in claim 16, wherein said coil winding is substantially annular in shape and is mounted substantially coaxially to an axis of rotation of said differential case.

20. The differential assembly as defined in claim 16, wherein said armature is non-rotatably coupled to said differential case.

21. The differential assembly as defined in claim 16, wherein said armature is disposed outside said coil winding of said electro-magnetic actuator.

22. The differential assembly as defined in claim 16, wherein said armature is substantially annular in shape and is mounted substantially coaxially to an axis of rotation of said differential case.

23. The differential assembly as defined in claim 16, wherein said armature has a substantially U-shaped cross-section.

24. The differential assembly as defined in claim 16, wherein said coil winding is wound about a coil housing rotatably mounted to said differential case and wherein said armature is off-set from said coil housing to a distance that ensures that said axial force applied upon said valve closure member by said electro-magnetic actuator is substantially constant as said valve closure member moves from said closed position to said open position and said axial force is a function only of said electrical current supplied to said coil winding.

25. The differential assembly as defined in claim 16, wherein said coil winding is wound about a coil housing rotatably mounted to an outer peripheral surface of said differential case.

26. The differential assembly as defined in claim 25, wherein said coil housing is substantially annular in shape and is mounted substantially coaxially to an axis of rotation of said differential case.

27. A differential assembly in a motor vehicle, said differential assembly comprising:

a differential case to be rotated by an outside drive torque;

two output shafts outwardly extending from said differential case and drivingly connected thereto through a differential gear mechanism;

a friction clutch pack for selectively engaging and disengaging said differential case and said output shaft, said clutch pack comprising a plurality of inner friction plates coupled to rotate with one of said output shafts and a plurality of outer friction plates coupled to rotate with said differential case, said friction plates being frictionally engageable with one another; and a hydraulic clutch actuator for selectively frictionally loading said clutch pack, said actuator comprising:

a gerotor pump disposed within said differential case and generating a hydraulic pressure in response to relative rotation between said differential case and one of said output shafts to frictionally load said clutch pack;

a piston assembly disposed within said differential case between said pump and said clutch pack and defining a pressure chamber; and a variable pressure relief valve assembly to selectively control said friction clutch pack, said variable pressure relief valve assembly including a valve closure member, a valve seat complementary to said valve closure member, and an electro-magnetic actuator including a substantially annular coil winding wound about a coil housing rotatably mounted to an outer peripheral surface of said differential case and a complementary armature radially spaced from said coil housing and axially movable relative thereto in response to a magnetic flux generated by said coil winding when an electrical current is supplied thereto, said armature engages said valve closure member and urges said valve closure member against said valve seat with an axial force produced by said magnetic flux and determined by a magnitude of said electric current so as to selectively set up a release pressure of said valve closure member between a maximum release pressure enabling complete actuation of said clutch pack and a minimum release pressure preventing actuation of said clutch pack depending on said magnitude of said electric current supplied to said electro-magnetic actuator, wherein said variable pressure relief valve assembly selectively controls a maximum pressure attainable within said pressure chamber continuously adjustable between said maximum release pressure and said minimum release pressure so as to enable partial actuation of said friction clutch pack.

* * * * *